United States Patent [19]

Tsukumo

[11] 4,093,390
[45] June 6, 1978

[54] BRACKET TIGHTENING DEVICE

[75] Inventor: Zenzaburo Tsukumo, Osaka, Japan

[73] Assignees: NTN Toyo Bearing Co. Ltd.; Zenzaburo Tsukumo, both of Osaka, Japan

[21] Appl. No.: 736,224

[22] Filed: Oct. 27, 1976

[30] Foreign Application Priority Data

Oct. 29, 1975 Japan .................. 50/130687
Oct. 29, 1975 Japan .................. 50/130688
Nov. 18, 1975 Japan .................. 50/139104
Nov. 18, 1975 Japan .................. 50/139105

[51] Int. Cl.² ................. F16B 2/02; F16B 7/04
[52] U.S. Cl. ............................. 403/373; 64/29
[58] Field of Search ........ 403/220, 373, 347; 19/266, 267, 272, 295; 64/29

[56] References Cited

U.S. PATENT DOCUMENTS

| 2,753,029 | 7/1956 | Babaian ............... 64/29 X |
| 3,079,648 | 3/1963 | Schiltknecht ............. 19/295 |
| 3,205,539 | 9/1965 | Kübler et al. ............ 19/267 |
| 3,278,994 | 10/1966 | Stahlecker et al. ........ 19/295 X |
| 3,663,992 | 5/1972 | Ooki ................... 19/295 X |
| 3,724,815 | 4/1973 | Hawkins et al. ........... 64/29 X |

FOREIGN PATENT DOCUMENTS

| 1,025,306 | 2/1958 | Germany ............... 19/266 |
| 1,083,720 | 6/1960 | Germany ............... 19/266 |
| 736,957 | 9/1955 | United Kingdom ........ 19/266 |

Primary Examiner—Wayne L. Shedd
Attorney, Agent, or Firm—Hall & Houghton

[57] ABSTRACT

A bracket tightening device for fixing a bracket or the like on a round rod or shaft. The device uses an intermediate body formed of a resilient material which is sufficiently strong within the restorable elastic limits, one end of the intermediate body being engaged at a fixed point on the bracket, the other end being engaged at a fixed point on the rod or shaft to which the bracket is to be secured. An adjusting screw is attached to the bracket and has its front end abutting against the intermediate portion of the intermediate body.

7 Claims, 20 Drawing Figures

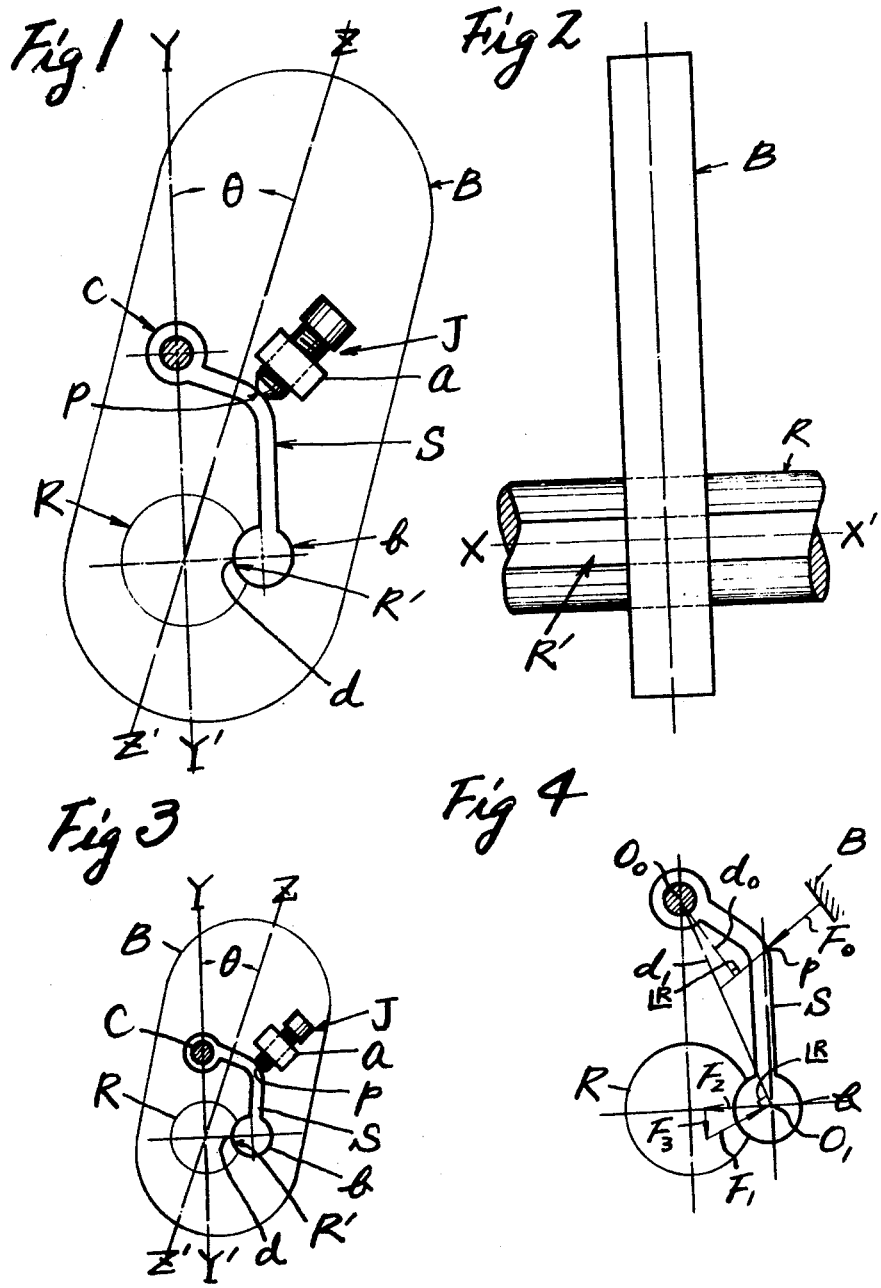

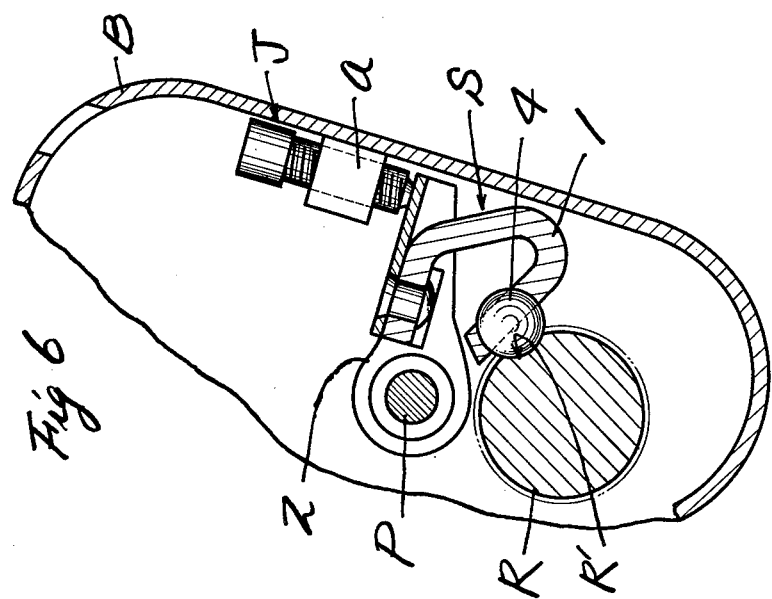
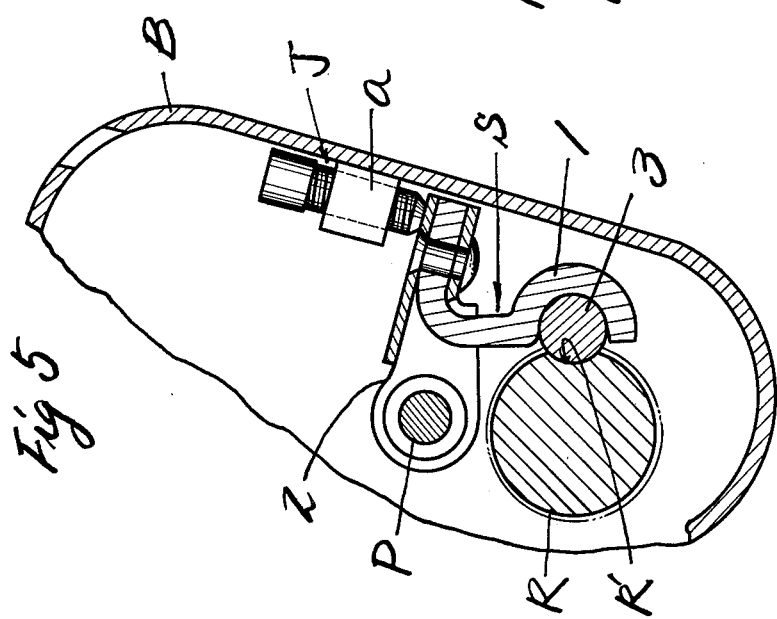

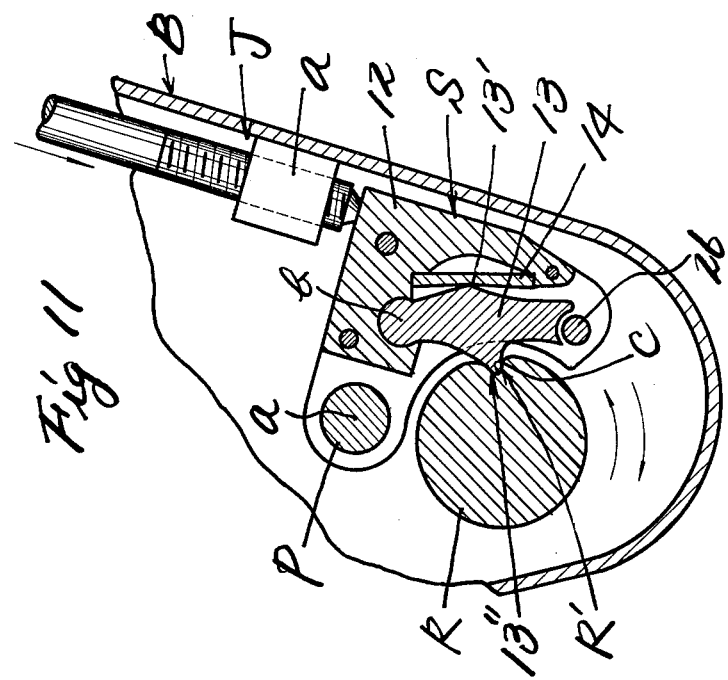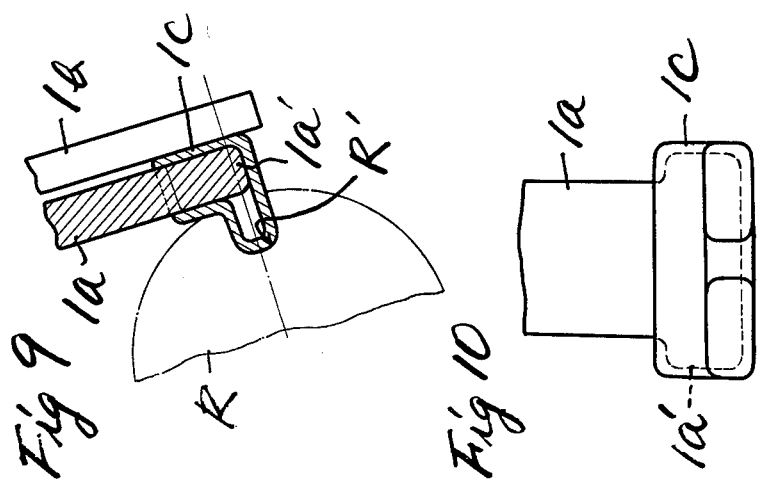

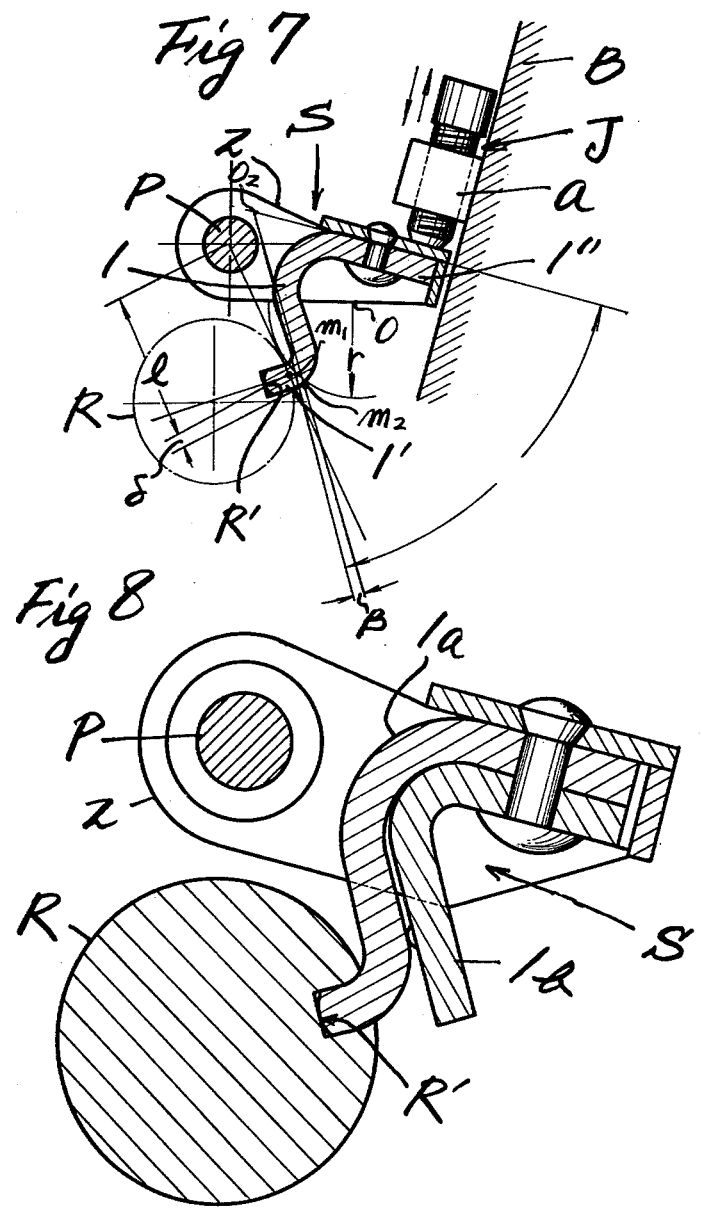

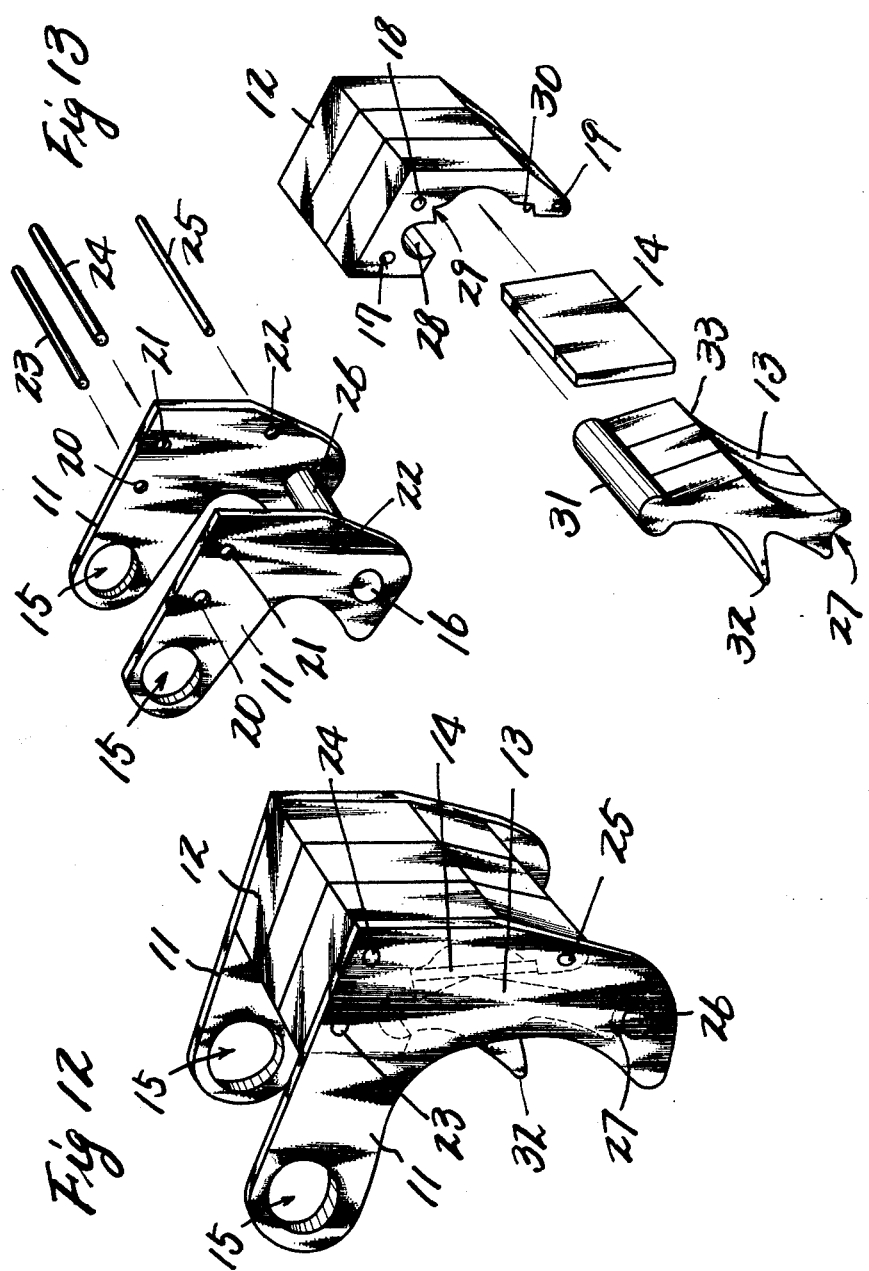

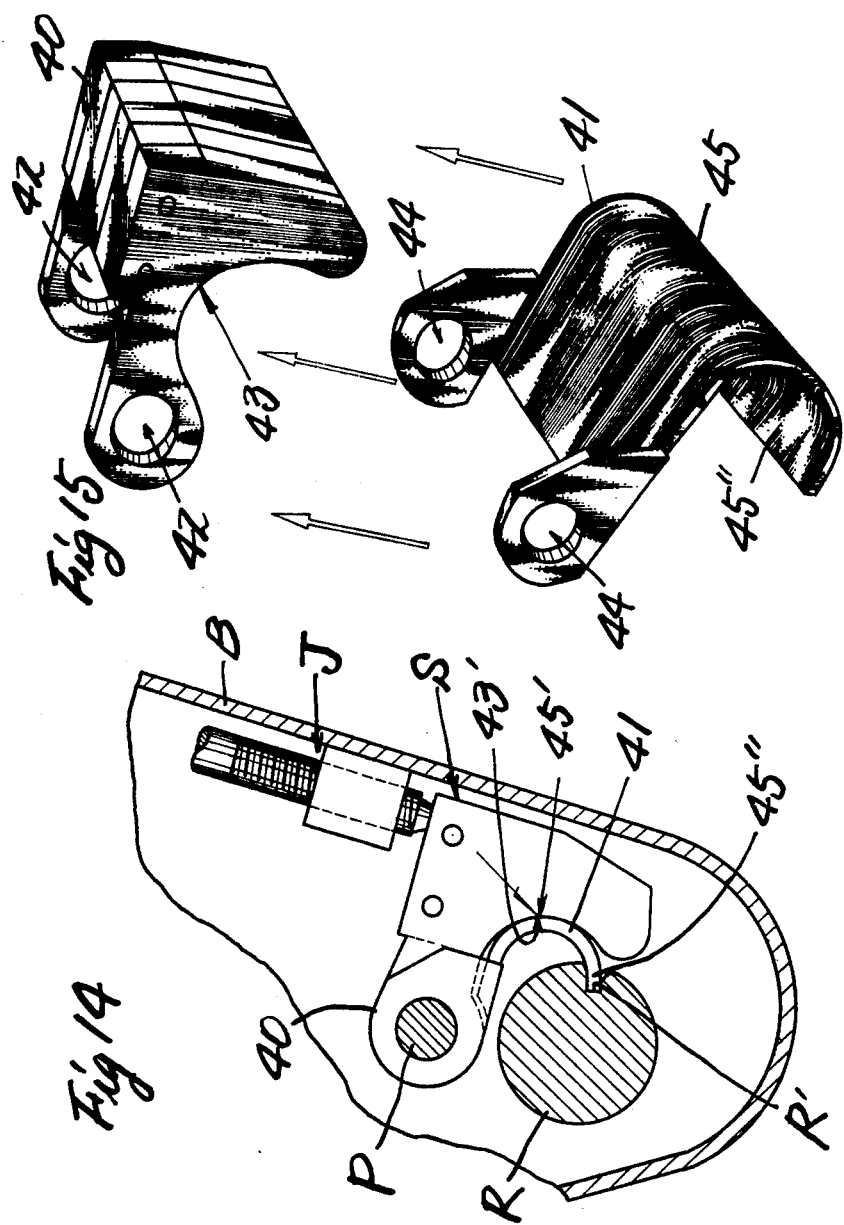

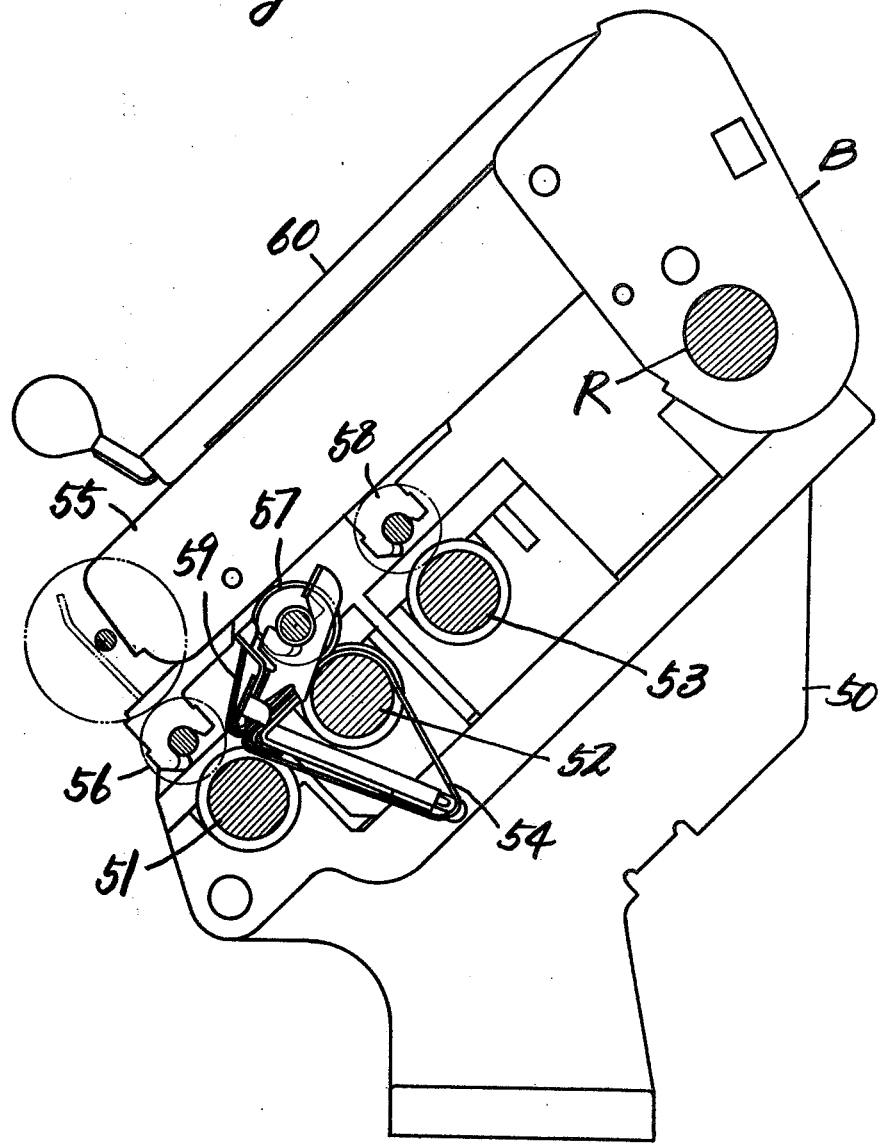

BRACKET TIGHTENING DEVICE

BRIEF DESCRIPTION OF THE INVENTION (a) Field of the Invention

The present invention relates to a device for tightening a bracket on a round rod or shaft, and more particularly it relates to such tightening device wherein the attaching angle of a bracket is made adjustable by making use of the expansive and contractive property of a resilient body.

(b) Description of the Prior Art

Conventionally, systems for fixing brackets and the like in mechanical equipment are, in most cases, those using set screws, clamps or keys, which have been used as most compact and safest systems. However, these conventional systems are not satisfactory for use in a machine section including many parts requiring fine adjustments, such as weighting arms in a textile machine limited in space and requiring high degree of reliability and stability with which they are attached and fine adjustments which can be freely made. More particularly, with such conventional systems, the condition set thereby from actual experience is liable to get out of order and making adjustments demands skill in the operator. Another drawback is that the systems, when used, are difficult of access. Various efforts have been made to remedy these drawbacks but they are substantially the same and have proved unsatisfactory. The conventional systems for direct setting by using set screws, clamps or keys have various drawbacks pointed out from actual experience in managing a large number of spindles or groups in factories, and various measures for improvement have been taken without satisfactory results.

SUMMARY OF THE INVENTION

The present invention provides a device for securing a bracket or the like to a round rod or shaft, comprising an intermediate body made of a resilient material sufficiently strong within the elastic limits, wherein with one end of said intermediate body attached to a fixed point on said bracket and the other end attached to a fixed point on the rod or shaft to which the bracket is to be fastened, the bracket and the rod or shaft are connected together as a unit and the front of an adjusting screw attached to said bracket abuts against intermediate portion of said intermediate body.

FEATURES OF THE INVENTION

A feature of the present invention is that adjustments can be freely and easily and conveniently made even during operation and that finely and accurately and that such adjustments can be made by anyone, contributing much to labor-saving in the case of management of a large number of things.

Another feature of the invention is that since, in tightened condition, an internal stress is exerted in the intermediate body, there is no danger of the tightened region being loosened by shocks, vibrations or the like. Accordingly, the stability and reliability of tightening action are high, and if applied to a locking device for weighting arms, the invention contributes much to the improvement of yarn quality and stability.

A further feature of the invention is that since the invention allows adjustments to be made by manipulating an adjusting screw, it is highly efficient and rational and in the case of management of a large number of things it is much more advantageous in operation and maintenance than conventional systems.

Another feature of the invention is that since a resilient member is used as the intermediate body as contrasted to a completely fixed type, there is flexibility and it is particularly superior if applied to a tightening device for weighting arms.

Another feature of the invention is that since the strong resilience of the intermediate body can be utilized, there is no trouble from the standpoint of design and operation. Further, in the case of a weighting arm, the device of the invention can be designed to serve also as a safety device against breakage in the event of cotton coiling around.

Yet another feature of the invention is that the device of the invention is simple in construction, requiring less space and hence enabling efficient use of space, and requires no special skill in production and assembly and is fitted for mass-production.

In addition, individual features of various embodiments of the present invention will be fully described in connection with the explanation of the construction.

BRIEF DESCRIPTION OF THE DRAWINGS

FIG. 1 is front view showing the basic construction of the present invention;

FIG. 2 is a side view of the same;

FIGS. 3 and 4 illustrate the operating principle of the invention;

FIGS. 5 through 15 illustrate concrete examples of the device of the invention;

FIG. 16 is an explanatory view of a fiber drafter to which the invention is applied;

In addition, FIGS. 17 and 19 are views where a weighting arm is set in operating condition, while FIGS. 18 and 19 are views where it is set in released condition.

DESCRIPTION OF THE PREFERRED EMBODIMENTS

Figure 17:
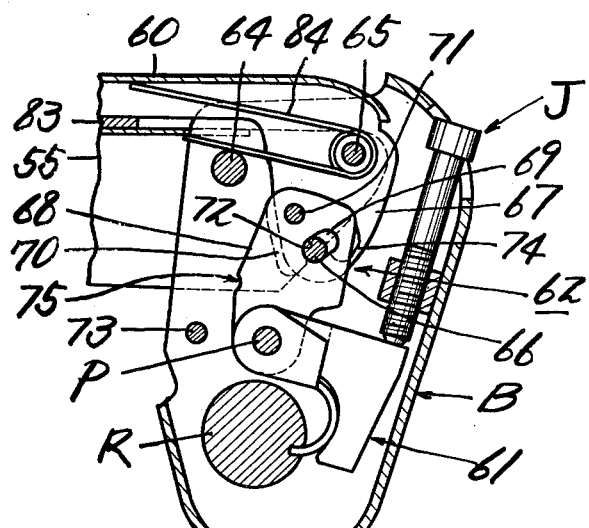
FIGS. 17 and 18 each show the relation between a locking device and a bracket tightening device for a weighting arm.

The basic construction of the present invention will now be described with reference to FIGS. 1 through 4. As shown in FIGS. 1 and 2, the basic construction of the invention comprises four elements, namely, a rod or shaft R, a main body, namely, a bracket B, to be fixed on said rod R, an adjusting screw section J, and an intermediate body S in the form of a resilient member such as a plate spring. In addition, FIG. 2 shows only the relation between the rod R and the bracket B. The intermediate body S has its front end $c$ pivotally attached to a fixed point on the bracket B and its rear end $b$ slidably contacted with and nested in an elongated groove R' formed in the rod R and extending in the direction of axis X—X thereof. Further, the adjusting screw section J includes a block $a$ fixed to a portion of the bracket B and formed with a threaded opening which receives an adjusting screw ready for pushing the intermediate portion of the expansible-contractible strong resilient body. In such arrangement, if the adjusting screw is adjusted in a direction in which the distance $c$–$b$ between the points $c$ and $a$ on the intermediate body S is increased, that is, in the direction in which a point $p$ is depressed, the distance $c$–$b$ is increased so that the bracket B is turned counterclockwise around the axis of the rod R, with the axis Z-Z' of the bracket B approaching the vertical axis Y-Y' of the rod to decrease the angle $\theta$. Conversely, if the set bolt is adjusted in the direction in which the degree of bend of the intermediate body S is increased to shorten the distance c-b, that is, in the direction in which the set bolt is upwardly retracted, the restoring force of the intermediate body S shortens the distance c-b so that the axis Z-Z' is moved away from the vertical axis Y-Y' to increase the angle $\theta$ and hence the bracket B is turned clockwise around the axis of the rod. In the restoring range of the intermediate body S, the residual internal stress F acts on the interface d between the rear end b of the intermediate body S and the rod R, providing a clamping pressure F1. Further, if the adjusting screw is loosened until F is equal or nearly equal to zero, the bracket B becomes adjustable in the axial direction X-X' of the rod R. The present invention is based on the principle described above. As shown in FIG. 3, a condition is established in which the two elements R and B to be connected together in adjustable predetermined fixed relation are fixedly connected together at the opposite ends of the intermediate body S, and such condition is changed by the adjusting screw attached to the bracket B. That is, the strain in the intermediate body S, or the bent condition thereof, is changed by the adjusting screw. By this action, the distance between c and b is adjustably changed to adjust the attaching angle $\theta$ between the rod R and the bracket B. In the above-mentioned range of adjustment, the intermediate body S is in restorable strained condition. Strain energy exists in the intermediate body S in this condition. As shown in FIG. 4, when an external force Fo (vector) is directly or indirectly exerted at point p by the adjusting screw, the following relation exists with respect to the center Oo at one end of the intermediate body S and the center O1 at the other end.

$$Fodo = F1d1$$

$$Fi = Fo\, do/d1$$

where F1 corresponds to a reaction to Fo, that is, it corresponds to a clamping force for the rod R and bracket B. Since this relation remains unchanged unless the amount of adjustment by the adjusting screw and hence the amount of strain in the intermediate body S is changed, no displacement between the three c, b, R takes place.

Concrete examples of the intermediate body S will now be described with reference to the figures.

FIGS. 5 and 6 show examples of the intermediate body S, using a combination of a plate spring 1 and a locking lever 2. The locking lever 2 is pivotally mounted on a pivot pin P fixed to the bracket B, and the base of the plate spring 1 is integrally secured to said locking lever and has its front end meshing with an elongated groove R' in the rod R. In addition, in the illustrated examples a roller 3 or a ball 4 is held in the front end of the plate spring 1 in order to facilitate the formation of the latter, such roller or ball being fitted in the elongated groove or pit R' formed in the rod R.

In an embodiment shown in FIG. 7, the front end 1' of the plate spring 1 is directly fitted in an elongated groove R' formed in the rod R. The base 1" of the plate spring 1 is fixed to the front end portion of the locking lever 2 while its front end 1' is held in fixed relation during tightening by the elongated groove R' formed in the rod R. Therefore, also in terms of dynamics, the opposite ends of the plate spring are in securely fixed supported condition during tightening. In this case, however, the degree of tightening should be such that some amount of lateral clearance which corresponds to the amount of deflection of the plate spring 1 when clamped exists between it and the rod R, as required. At any rate, it is necessary to select said various conditions. As a result of the plate spring 1 being arranged in the above relation, the relative positional attaching relation between the bracket B and the rod R is shifted by an amount corresponding to a displacement $\delta$ of a material point m1 moving on the circumference of a circle of radius r with its center O at the imaginary bend of the intermediate body S composed of the locking lever 2 and plate spring 1 corresponding to the amount of adjustment of the adjusting screw. In this case in order to secure the bracket B to the rod R with no play therebetween, it is necessary to design the plate spring 1 so that it may have a sufficient modulus of section to endure a load, e.g., imposed by a weighting arm.

FIG. 8 shows an embodiment in which the intermediate body S is constituted by two plate springs 1a and a locking lever 2, said plate spring 1b serving to increase and compensate the flexing force of the other plate spring 1a. The front end 1a' of the plate spring 1a, as shown in FIGS. 9 and 10, may be constituted by another member 1c held between the plate springs 1a and 1b.

FIGS. 11 through 13 show another example of the intermediate body S according to the present invention, wherein it is composed of locking levers 11, a swing block 12, a link block 13 and a plate spring 14. This embodiment, instead of using a resilient plate spring as means interconnecting the rod R and the pivot pin P, uses the swing block 12 and link block 13 assembled with the locking lever 11 so as to form a linkage constructed in a swivel joint fashion, thereby variably interconnecting the tightening rod or shaft R and the pivot pin P. This construction includes a strong plate spring 14 contained in the swing block 12 receiving it at its opposite ends, with the middle of the surface of the plate spring 14 opposite to its supported surface being in pressure contact with the back ridge 13' of the link block 13. This gives the link motion mechanism a resilient action having directivity and provides a function closely associated with adjustment of the adjusting screw and also exerts a sufficient pressure to establish a tightening or fitting condition between the long groove R' of the rod R and the fitting portion 13" of the link block 13. In the concrete, the intermediate body S is constructed in the following manner.

As shown in FIGS. 12 and 13, the swing block 12 is placed between and made integral with the locking levers which consist of a pair of plates, with the base of the locking levers 11 supported for up and down pivotal motion on the pin P. The locking levers 11 are each provided with a pivot-pin receiving hole 15, a lower pin receiving hole 16, and holes 22, 21, 22 corresponding to attaching holes 17, 18, 19 formed in the swing block 12, and they are connected together by pins or bolts 23, 24, 25. In addition, 26 designates a pin for interconnecting the lower portions of the pair of locking levers 11, said pin cooperating with a recess 27 in the lower end of the link block 13 to prevent the popping-out of the link block 13. The swing block 12 is inverted V-shaped, with the upper surface being flat, and it is internally provided with recesses 28, 29 and 30 for holding the link block 13 and plate spring 14. The link block 13 has a cylindrical portion 31 at the upper end and a recess 27 at the lower end for engaging said pin 26 fitted in the lower portions of the locking levers 11. Further, the link block 13 is formed with a projection 32 at the intermediate region of the front thereof adapted to be fitted in the elongated groove R' of the rod R and a second projection 33 in the back thereof for engagement with the plate spring 14. There is provided an adjusting screw J extending along the rear surface of the bracket R and adapted to adjustably urge the upper surface of the swing block 12. In addition, the plate spring 14 plays an important role in causing the projection 32 on the link block 13 to resiliently engage the elongated groove R' of the tightening rod R. In the above construction, if the adjusting ascrew J is tightened, the swing block 12 is turned clockwise around the axis of the pivot pin P. As a result, in the relation of $a - b - c$ constituted by the link mechanism, the distance between $a$ and $c$ is increased. Therefore, the bracket B is displaced counterclockwise. On the other hand, the plate spring 14 urging the link block 13 is increased in its bending deformation while increasing the pressure with which the projection 13'' (corresponding to the reference numeral 32 in FIGS. 12 and 13) on the link block 13 is urged into the elongated groove R' of the rod R. At a position where the adjustment of the adjusting screw J is stopped, these changes are stopped and an equilibrated stationary condition is established.

If the adjusting screw J is manipulated in the direction in which it is loosened, the energy stored in the plate spring 14 acts to turn the swing block 12 counterclockwise, so that in the relation of $a - b - c$ constituted by the link mechanism, the distance $a - c$ is decreased. This action is maintained until the lower end 27 of the link block 13 abuts against the pin 26 fixed to the lower end of the locking levers 11. In this case, the direction in which the bracket B is turned is clockwise. When the adjustment of the adjusting screw J is stopped, an equilibrated stationary condition similar to the one described above is established at the original position.

FIGS. 14 and 15 show another example of the intermediate body S according to the invention, wherein it is composed of locking levers 40 and a plate spring 41. The locking levers 40, as shown in FIG. 15, are inverted L-shaped, having holes 42 in the base for loosely receiving a pin P, and an arcuate surface 43 in the inner surface. The plate spring 41 consists of bases 44 for loosely receiving the pivot pin P, and a spring portion 45 extending from said bases and curved so as to be received by the arcuate surface 43 of the locking lever 40. The curvature of the spring portion 45 is smaller than that of the locking lever 40. As a result, in assembled condition, the central region 43' of the arcuate surface 45 positively abuts against the central region 43' of the spring portion 45, as shown in FIG. 14. The free end 45'' of the spring portion 45 is fitted in the elongated groove R' of the rod R. Because of the arrangement described above, if the adjusting screw J is adjusted in the direction in which it is tightened, the spring portion 45 of the tightening plate spring 41 is expanded by the inner arcuate portion 43'. As a result, the center distance between the elongated groove R' of the rod R in which the front end 45'' of the spring portion 45 is fitted, and the pivot pin P providing a fulcrum for the plate spring 41, is increased by an amount corresponding to the amount of said expansion. In this connection, since the rod is fixed to the machine frame, it is not moved and hence the center of the pivot pin P is turned around the end 45'' of the tightening plate spring 41, which remains immovable, by an amount proportional to the amount of expansion of the tightening plate spring 41 which interconnects the rod R and locking lever 40. In other words, the rod R provides an axis around which the bracket B is turned, and this displacement is such that because of the various relations established in the figure the bracket B is turned counterclockwise around the rod R as guided by the bore in which the rod R is fitted, through a certain angle to a new position, where it is fixed in position.

The bracket tightening devices described so far with reference to FIGS. 1 through 15 may be applied to a weighting arm for fiber drafter provided with a locking device shown in FIG. 16, when the features of the tightening devices can be fully developed. The manner in which such bracket tightening device is applied will now be described with reference to FIGS. 16 through 20.

In FIG. 16, the numeral 50 designates a roller stand on the upper surface of which are arranged a front bottom roller 51, a middle bottom roller 52, a rear bottom roller 53, and a bottom apron 54 entrained around said middle bottom roller 52. A weighting arm 55 is pivotally mounted at its base on the bracket B attached to said roller stand 50. The weighting arm 55 carries a front top roller 56, a cradle roller 57, a rear top roller 58 and a top apron 59 which are pressed against the rollers and bottom apron mounted on the roller stand 50. Designated at 60 is a handle lever for raising and lowering the weighting arm 55.

Figure 18:
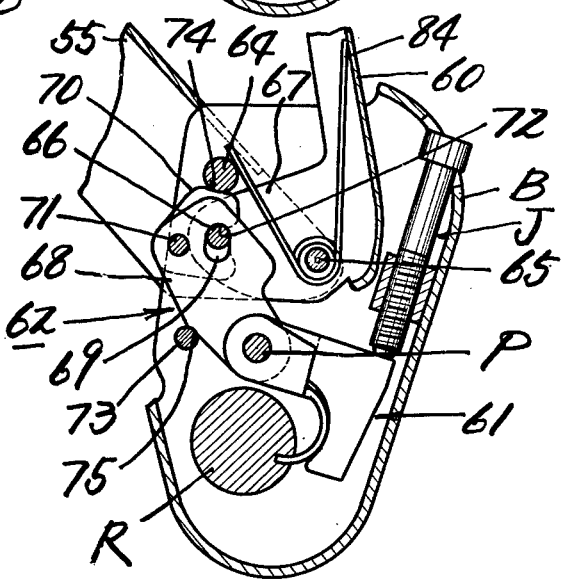
Figure 19:
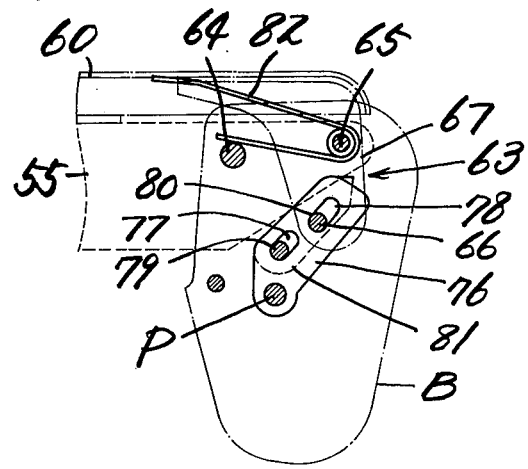
FIGS. 19 and 20 show a modification of the arrangement shown in FIGS. 17 and 18.
Figure 20:
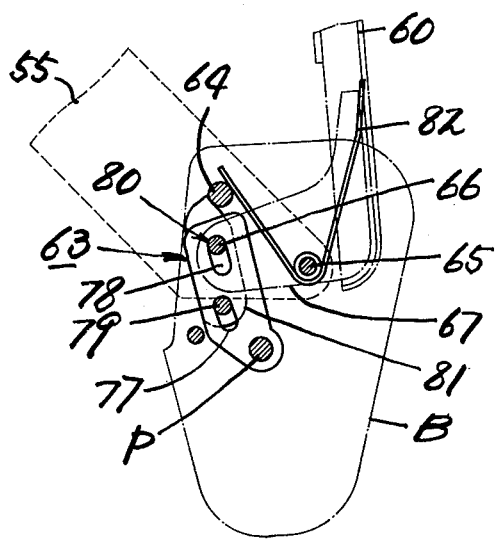

Included in the bracket B secured to the rod R on the roller stand are a bracket tightening device 61 and a locking device 62 or 63 for locking the weighting arm 55 in its operating position (FIGS. 17 and 19) and in its opened position (FIGS. 18 and 20). The bracket tightening device 61 shown in FIGS. 17 and 18 is one using the intermediate body described with reference to FIGS. 13 through 15, and a detailed description thereof will be omitted. Further, in FIGS. 19 and 20 the bracket tightening device is omitted from the illustration.

The construction and operation of the locking device will now be described with reference to FIGS. 17 and 18.

The base of the weighting arm 55 is inserted in the bracket B secured to the rod R and is pivotally connected thereto by an arm pin 64. The base of the handle lever 60 mounted on the upper surface of the weighting arm 56 is pivottaly connected to the end of the weighting arm 55 by a handle pin 65. Designated at 66 is an operating pin loosely inserted in the front end portion of the levering portion 67 of the handle lever 60. Designated at 68 are a pair of link plates having one set of ends thereof pivotally mounted on a pivot pin P, said link plates being formed with elongated openings 69 adjacent the other set of ends for receiving the operating pin 66. A substantially triangular cam plate interposed between the pair of link plates 68 is pivotally connected to a portion of the link plates 68 by a cam pin 71 and has a recess 72 adapted to receive the operating pin 66. Designated at 73 is a stay pin which controls the movement of the link plates 68 when the weighting arm 55 is in its opened position.

In the operating condition shown in FIG. 17, the weighting arm 55 has a clockwise-directed torque acting thereon. The torque acts on the handle lever 60 through a stop member 83 fixed to the lower surface of the handle lever 60, but since the operating pin 66 is located on the right-hand side of a line joining the pivot pin P and the handle pin 65, i.e., the deadline, as viewed in the figure, the whole mechanism is locked. If the handle lever 60 is manipulated in this condition, since the operating pin 66 is abutting against the lower edges of the elongated openings in the link plates 68, the weighting arm 66 does not move and hence the handle lever 60 alone is turned around the axis of the handle pin 65, thus turning the link plates 68 counterclockwise around the axis of the pivot pin P. At this time, the operating pin 66 is moved upwardly in the elongated opening 69. When the operating pin passes across the deadline, the clockwise-directed torque acting on the weighting arm 55 causes the latter to begin turning clockwise around the axis of the arm pin 64. When the front ends of the link plates 68 pass under the lower end of the arm pin 64, the operating pin 66 on the levering portion 67 of the handle lever 60 causes the cam plate 70 to be turned counterclockwise around the axis of the cam pin 71, with the cam surface 74 of the cam plate 70 engaging the arm pin 64 and with the recesses 75 in the link plates 68 engaging the stay pin 73, as shown in FIG. 18. In the opened condition shown in FIG. 18, the link plates 68 and the cam plate 70 are in bridging relation, disposed between the pivot pin P and the arm pin 64 while the operating pin 68 is positioned on the left-hand side of the deadline defined by the pivot pin P and the arm pin 64, whereby the weighting arm 55 is prevented from being further turned clockwise or counterclockwise.

In order to bring the weighting arm 55 which is now in the opened condition shown in FIG. 18 to the operating condition shown in FIG. 17 and set it in that condition, the handle lever 60 is turned counterclockwise, with the operating pin 66 on the levering portion 67 of the handle lever 60 causing the cam plate 70 to be retracted into the link plates 68 while allowing the operating pin 66 to pass across the deadline, whereupon the weighting arm 55 falls under its own weight to assume a laid-down position, where the operating pin 66 is positioned again on the right-hand side of the deadline as shown in FIG. 17, so that the operating condition is retained.

FIGS. 19 and 20 show another example of the locking device. The locking device 63 comprises a pair of link plates 76 each provided with two long, upper and lower openings 77 and 78, and a cover plate 81 disposed between said link plates 76 and having a locking pin 79 adapted to be inserted in said lower elongated opening 77 and a pin aperture 80 conforming to the upper elongated opening 78. An operating pin 66 loosely inserted in the levering portion 67 of a handle lever 60 is inserted in the upper elongated opening 78 and the pin aperture 80.

In the operating condition shown in FIG. 19, the operating pin 66 is positioned on the right-hand side of the deadline joining the handle pin 65 and the pivot pin P, so that the weighting arm 55 and the handle lever 60 are locked in the operating condition. Further, the cam plate 81 is retracted into the pair of link plates 76. The operating pin 66 and the locking pin 79 are disposed on the lower edges of the elongated openings 78 and 77, respectively. In the operating condition, if the handle lever 60 is manipulated, the weighting arm 55 is not turned but the handle lever 60 alone is turned around the axis of the handle pin 65 and with this turning movement the link plates 76 are turned counterclockwise around the axis of the pivot pin P. When the operating pin 66 passes across the deadline defined by the handle pin 65 and the pivot pin P, an upward force acting on the weighting arm 55 cooperates with another upward force exerted by the handle lever to turn the weighting arm 55 clockwise, with the handle lever raised by the energy stored in a spring 82, and when the upper ends of the link plates 76 have passed under the arm pin 64, the operating pin 66 on the levering portion 67 causes the cam plate 81 to project upwardly above the upper ends of the link plates 76 to engage the arm pin 64, so that, as shown in FIG. 20, the link plates 76 and cam plate 81 interposed between the pivot pin P and the arm pin 64 so as to bridge the gap therebetween. In this condition, the operating pin 66 is positioned on the left-hand side of the deadline defined by the arm pin 64 and pivot pin P, and the opened condition of the weighting arm is maintained.

In order to bring the weighting arm 55, which is now in its opened position, to its operating position, the handle lever 60, which is now erected, is pulled forwardly, so that the cam plate 81 is retracted into the plates 76 by the operating pin 66 and the latter passes across the dead line, thus allowing the weighting arm 55 and handle lever 60 to return to assume the condition shown in FIG. 19, in which they are locked again.

The spring 84 shown in FIGS. 17 and 18 and the spring 82 shown in FIGS. 19 and 20 are wound around the handle pin 65, with the opposite ends resting against the upper surface of the arm pin 64 and the inner surface of the handle lever 60. In the opening operation such springs serve to impart an opening force to the handle lever 60, and in the opened condition shown in FIGS. 18 and 20 they serve to prevent the handle lever 60 from being laid down under its own weight. That is, in the erected condition shown in FIGS. 18 and 20 if the handle lever 60 is inadvertently laid down, this will bring about the same result as when the handle lever 60 is manually laid down. More particularly, if the handle lever 60 is laid down, the cam plate 70 is retracted into the link plates 68 in FIG. 8 while in FIG. 20 the cam plate 81 is retracted into the link plates 76, thus releasing the weighting arm 55 from the erection-retaining action, allowing the weighting arm to be laid down under its own weight, so that danger is entailed. It is the springs 84, 82 that preclude such situation.

Thus, the locking device and the tightening device described above are featured by using the pivot pin P, which is a component of the bracket tightening device, as a component of the locking device, and using a combination of the pivot pin P and arm pin 64 and a combination of the pivot pin P and handle pin 65 to define deadlines for the weighting arm 55 in its operating and opened conditions, respectively, with the locking device being interposed between the pivot pin P and arm pin 64 to bridge the gap therebetween in the opened condition so as to maintain the latter condition more securely.

Whiles there have been described herein what are at present considered preferred embodiments of the several features of the invention, it will be obvious to those skilled in the art that modifications and changes may be made without departing from the essence of the invention.

It is therefore to be understood that the exemplary embodiments thereof are illustrative and not restrictive of the invention, the scope of which is defined in the appended claims and that all modifications that come within the meaning and range of equivalency of the claims are intended to be included therein.

I claim:

1. A device for tightening a bracket on a round rod or shaft by making use of resiliency, comprising an intermediate body having sufficient resiliency within the restorable elastic limits, one end of said intermediate body being pivotally mounted at a fixed point on the bracket, the other end thereof being engaged at a fixed point on the outer surface of the rod or shaft on which the bracket is to be tightened, an adjusting screw attached to said bracket and having its front end abutting against the intermediate portion of said intermediate body.

2. A device for tightening a bracket on a round rod or shaft by making use of resiliency, comprising a bracket having an opening at a predetermined position thereon, a rod or shaft adapted to be loosely fitted in said opening and having a radially extending elongated groove in the outer surface thereof, a pivot pin fixed to the bracket, an intermediate body arranged to have resiliency and having one end thereof rotatably supported on said pin and the other end thereof being fitted in the elongated groove in said rod or shaft, and an adjusting screw screwed into a portion of said bracket and having its front end abutting against the intermediate portion of said intermediate body.

3. A device as set forth in claim 2, wherein said intermediate body comprises a locking lever member pivotally mounted at one end thereof on a pivot pin, and at least one plate spring having one end thereof fixed to the other end of said locking lever member and the other end thereof fitted in the elongated groove in the rod.

4. A device as set forth in claim 2, wherein said intermediate body comprises a locking lever member pivotally mounted at one end thereof on a pivot pin, a swing block held by said locking lever member and having a flat portion in the upper region thereof and a plurality of recesses in the lower region thereof, a link block pivotally mounted at one end thereof by said swing block and having a projection fitted in the elongated groove in said rod or shaft, and a plate spring held by said swing block and resiliently urging said link block from the rear, wherein the adjusting screw screwed into a portion of the bracket has its front end abutting against the flat portion of the swing block.

5. A device as set forth in claim 2, wherein said intermediate body comprises a locking lever member having a flat portion in the upper region and an arcuate portion in one side and pivotally mounted at the other end thereof on a pivot pin, a plate spring received in said arcuate portion of said locking lever member and fixed at one end thereof to the locking lever member, the rear surface in the middle of the bight abutting against the arcuate portion of the locking lever member, the curvature of said plate spring being smaller than that of the arcuate portion of the locking lever member, the other end of said plate spring being fitted in the elongated groove in said rod or shaft, wherein the adjusting screw screwed into a portion of the bracket has its front end abutting against the flat portion of the locking lever member.

6. A bracket tightening device for mounting a weighting arm for a fiber drafter provided with a locking device, wherein the bracket tightening device comprises a bracket having an opening at a predetermined position thereon, a rod or shaft adapted to be loosely fitted in said opening and supported on a roller stand, a pivot pin fixed to said bracket, an intermediate body arranged to have resiliency and pivotally mounted at one end thereof on said pivot pin, the other end being fitted in an elongated groove in said rod or shaft, and adjusting screw screwed into a portion of said bracket and having its front end abutting against the intermediate body, and wherein the locking device whereby the weighting arm mounted on the bracket is locked at an operating position and an opened position comprises an weighting arm pivotally mounted on the bracket by an arm pin, a handle lever pivotally mounted on said weighting arm by a handle pin, a link plate pivotally mounted at one end thereof on the pivot pin of said locking device fixed to the bracket, the other end of said link plate being provided with an elongated opening which receives an operating pin on the levering portion of the handle lever, and a cam plate pivotally mounted at one end thereof on said pivot pin and having a recess in the lateral surface thereof for holding said operating pin, and wherein said pivot pin is used as a common component of the bracket tightening device and weighting arm locking device and a locking mechanism is interposed between the pivot pin and arm pin and between the pivot pin and handle pin.

7. A device as set forth in claim 6, wherein the locking device whereby the weighting arm mounted on the bracket is locked at an operating position and an opened position comprises a weighting arm pivotally mounted on the bracket by an arm pin, a handle lever pivotally mounted on said weighting arm by a handle pin, a link plate pivotally mounted at one end thereof on the pivot pin of said locking device and having two elongated openings in the upper and lower regions thereof, the upper elongated opening receiving the operating pin on the levering portion of the handle lever, and a cam plate rotatably receiving said operating pin and having a locking pin adapted to be received in the lower elongated opening in the link plate, said cam plate being projected and retracted relative to the upper edge of said link plate.

* * * * *